United States Patent
O'Brien

[11] 3,784,315
[45] Jan. 8, 1974

[54] PORTABLE TOOL FOR DRILLING HOLES IN HARDENED STEEL

[76] Inventor: Eugene O'Brien, 5567 Wheeler St., Philadelphia, Pa. 19143

[22] Filed: Mar. 9, 1972

[21] Appl. No.: 233,059

[52] U.S. Cl. .................. 408/92, 408/712, 173/32
[51] Int. Cl. ............................................. B23b 45/14
[58] Field of Search .................. 408/92, 95, 712; 173/32

[56] References Cited
UNITED STATES PATENTS

| 1,097,709 | 5/1914 | Fosselman | 408/92 |
| 1,763,552 | 6/1930 | Cook | 408/95 |
| 2,667,092 | 1/1954 | Schaffer | 408/92 |
| 3,122,032 | 2/1964 | Schoonover | 408/92 X |
| 2,768,663 | 10/1956 | Jones | 408/712 X |
| 2,737,065 | 3/1956 | Piersall | 408/712 X |

FOREIGN PATENTS OR APPLICATIONS
1,260,440  3/1961  France .................. 408/92

*Primary Examiner*—Andrew R. Juhasz
*Assistant Examiner*—Z. R. Bilinsky
*Attorney*—Max R. Millman

[57] ABSTRACT

A portable tool for drilling holes in hard metal pieces, such as safe lock mounting plates, employing a high speed electric drill, a lever arm, a fulcrum at one end of the lever arm, means to adjustably attach the fulcrum to a support near the workpiece and means operatively connecting the lever arm at an intermediate position thereof to the drill body in such a manner that the force applied to the lever towards the workpiece is transmitted along the axis of the drill bit thus making it possible to drill a hole rapidly and with minimal effort and at various angular positions.

9 Claims, 5 Drawing Figures

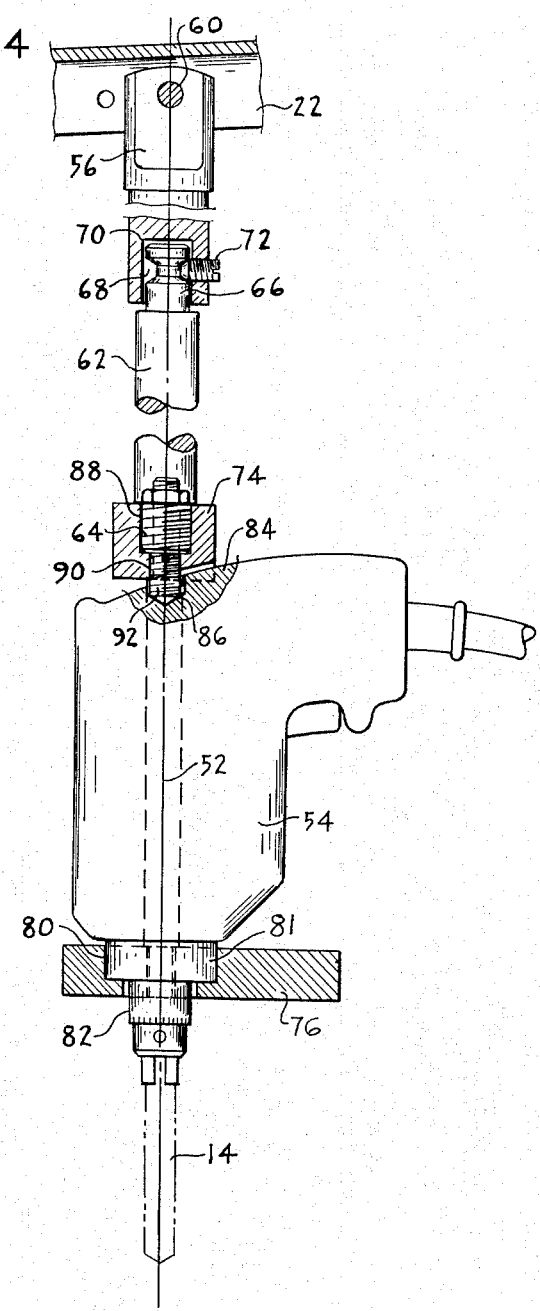
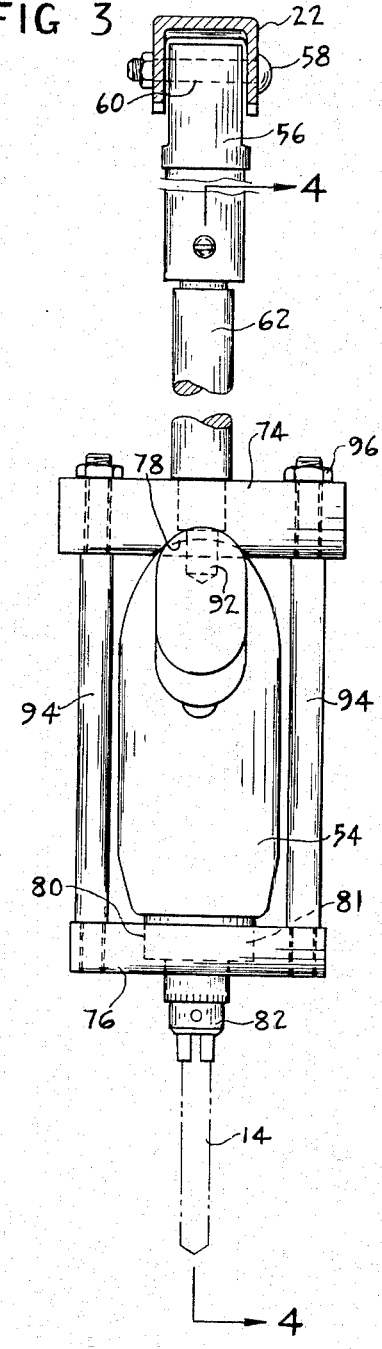
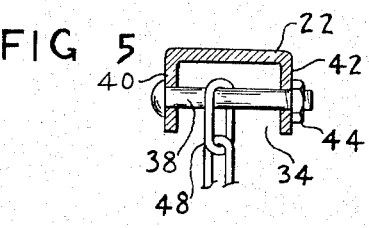

PORTABLE TOOL FOR DRILLING HOLES IN HARDENED STEEL

This invention relates to a tool for drilling holes in resistant metals particularly hardened steel.

The need to drill holes in hard metal plates and similar members frequently arises outside of a machine shop to which one cannot transport a drill press or use it effectively because it is too large and cumbersome. One such application is the installation of a lock in the mounting plate of a burglarized safe.

Heretofore, holes were drilled in case hardened steel using a high speed drill and a carbide tipped twist drill bit. The procedure was tedious and uneconomical even using a high speed drill of about 5000 rpm since it took about three-quarters to one hour and a great deal of hand pressure to drill a hole in one-fourth to three-eighth inch thick hardened steel. And, when one used a slower drill, at or below 2500 rpm, it would take several hours, if indeed it was able to accomplish the drilling of a through hole at all. Frequently, one would end up merely with a highly polished indentation and no more. Accordingly, locksmiths have frequently refused to repair burglarized safes for these reasons.

It is the primary object of this invention to provide a tool which will effectively drill a hole in hardened metal using conventional carbide tipped twist drill bits which overcomes the disadvantages noted above and effects the drilling of holes in a fraction of the time, usually seconds, of that required in the method now in use thereby saving considerable time, effort and money.

Another object of the invention is to provide a tool of the character described which is portable and adjustable so that it can be readily transported to sites requiring the drilling of holes in hardened metal and can reach areas generally considered inaccessible.

Another object is to provide a tool to drill holes in hardened metal which employs the mechanical advantages of a hand operated lever and a means which causes the applied force to be transmitted axially of the drill bit thereby making it possible for the rotating bit to force its way through the workpiece quickly and with modest exertion, the hole being thereby formed by a combination of abrasion and metal chipping caused by heat generated due to friction between the bit and the workpiece.

Another object of the invention is to provide a tool to drill holes in hardened metal in which the fulcrum of the hand lever can be adjustably and removably secured to any accessible support and the tool can be readily manipulated and operated in a variety of positions, horizontal and angular in addition to vertical.

Another object is to provide a tool of the character described which is relatively simple in construction and design and hence relatively inexpensive to manufacture and operate.

These and other objects of the invention will become more apparent as the following description proceeds in conjunction with the accompanying drawings, wherein:

FIG. 3 is an elevational view looking to the left on FIG. 1 of the tool;

FIG. 4 is a sectional view taken on the line 4—4 of FIG. 3; and

FIG. 5 is a sectional view taken on the line 5—5 of FIG. 1.

Specific reference is now made to the drawings in which similar reference characters are used for corresponding elements throughout.

Figure 1:
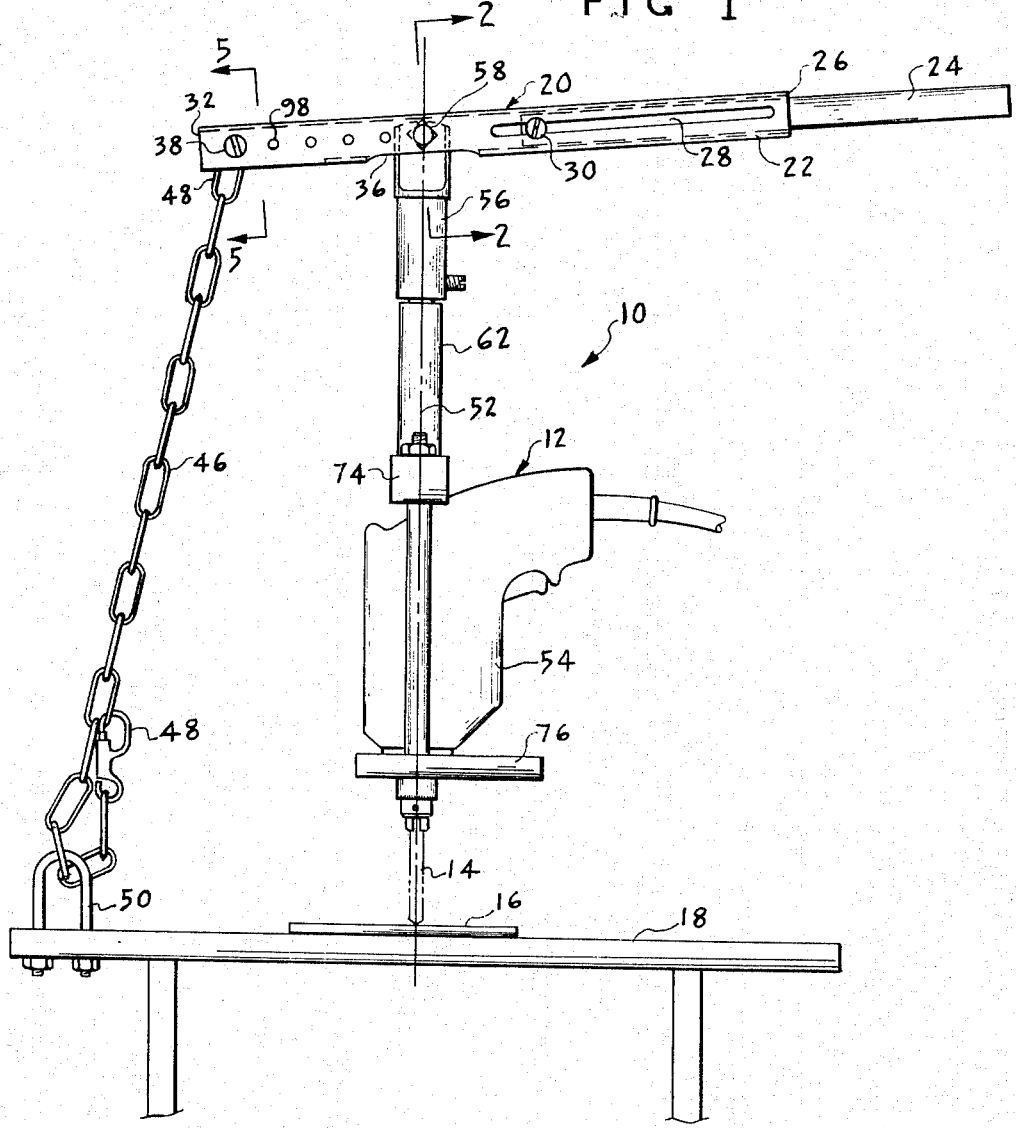
FIG. 1 is a side elevational view of the tool.

The tool is generally indicated at 10 and employs a conventional electric hand drill 12, preferably a high speed drill, i.e. one which operates at 2500–5000 rpm, and a carbide-tipped twist drill bit 14. The remaining components comprise the means by which the conventional high speed drill and carbide-tipped twist drill bit may be transported to a work site and be employed to rapidly and effectively drill a hole in a hardened metal, preferably case hardened steel, workpiece 16, such as a safe lock mounting plate. While the workpiece 16 is here shown lying horizontally on a support 18 and the drill is generally vertical, it will be understood that this is merely illustrative since the tool can and probably most often will be used in horizontal and angular positions where the location and disposition of the workpiece militates against the use of a drill in said vertical position.

An elongated lever member 20 is provided which comprises an outer tubular member 22 of generally rectangular cross-section and a handle 24 preferably a rod which is slidable through one open end 26 of the tubular member 22 and may be retained in a longitudinally adjusted position therein by any suitable means as, for example, an elongated slot 28 in one wall of the tubular member and a headed screw 30 extending therethrough and threadedly engaged in the handle 24 so that the head of the screw may be tightened against the slot in any adjusted position.

The opposite end 32 of the tubular member 22 is also open and a predetermined length of its bottom wall is cut out to form an elongated opening 34 as seen in FIG. 5. Intermediate its ends, the bottom wall of the tubular member is also cut out to form an opening 36 for a purpose soon to appear.

A pin preferably in the form of a headed bolt 38 is provided whose shank extends transversely through the side walls 40 and 42 of the tubular member 22 adjacent its end 32 and is there removably affixed by an appropriate nut 44. The shank of the bolt 38 serves as a fulcrum upon which is pivotally mounted for movement around the axis of the bolt one end of an adjustable anchor or tie member, preferably a length of chain 46. The link 48 at one end of the chain is mounted over the shank of the bolt 38 and extends through the opening 34, the other end of the chain being equipped with an appropriate means, such as an eye member 48, by which that end of the chain can be made to removably engage an appropriate support, shown illustratively in FIG. 1 as a U-bolt 50.

Intermediate its ends, the lever member 20 is operatively connected to a means by which the force exerted on the handle 24 towards the workpiece will be effectively transmitted primarily along the axis 52 through the casing or body 54 of the drill and the axis of the bit.

Figure 2:
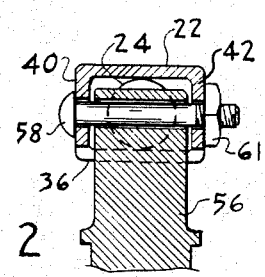
FIG. 2 is a sectional view taken on the line 2—2 of FIG. 1.

A rod 56 is provided whose upper end is flattened and extends through the opening 36 in the bottom of the tubular member 22 of the lever between its side walls 40 and 42 as seen in FIGS. 1 and 2. A headed bolt 58 is provided whose shank extends through a transverse opening 60 in the upper end of the rod 56 and through the side walls 40 and 42 and there fixed by an appropriate nut 61 so that the rod 56 is pivotal about the axis of the bolt.

Another rod 62 is provided which has a reduced externally threaded portion 64 at its lower end and a reduced unthreaded portion 66 at its upper end which contains a circumferential groove 68. The lower end of the rod 56 has an axial recess 70 opening therethrough which receives the reduced upper end portion 66 of the rod 62 and is retained for axial rotation therein by a set screw 72 carried by the rod 56 whose inner end extends into the groove 68.

A yoke member is provided which includes an upper bar 74 which spans the top of the drill casing, a lower bar 76 which spans the bottom of the drill and means holding said upper and lower bars against the drill casing. The upper bar includes an arcuate cut-out 78 which receives and conforms to the upper curvature of the drill casing 54 opposite the bit. The lower bar includes a central stepped opening 80 to snugly receive and seat the thrust collar 81 at the lower end of the drill casing to distribute the pressure thrust between bars 74 and 76, the drill chuck 82 carrying the bit extending through said opening.

In the upper arcuate portion 84 of the drill casing, a recess 86 is provided whose axis is in alignment with the drill bit axis 52. The upper bar 74 of the yoke includes an internally threaded counterbore 88 to receive the lower threaded reduced portion 64 of the rod 62. Opening through the upper bar 74 and communicating with the counterbore 88 is a reduced internally threaded bore 90 which mounts an externally threaded set screw 92. Tie rods 94 interconnect the upper and lower bars and hold them together tightly against the drill casing by appropriate locking nuts 96.

In assembly, the electric hand drill casing 56 is placed in the yoke so that the set screw 86 enters the center recess 86 in the upper arcuate portion 84 of the casing and the locking nuts 96 are tightened. Then the set screw 92 is tightened so as to hold the drill body and yoke firmly together and press the thrust collar 81 of the drill casing into the stepped recess 80 in the lower bar 76. It will be understood that the thrust collar 81 can be removably secured upon the bottom portion of the drill casing by any suitable means as, for example, by the use of a set screw, screwing the thrust collar onto the casing itself, etc. The rod or post 62 is then screwed home into the counterbore 88 of the upper bar 74 to secure the set screw 92 from backing off. The upper rod 56 is placed over the lower rod 62 and the set screw 72 is screwed in far enough to connect the rods 56 and 62 against separation but permit relative axial movement between them. The lever is then mounted by means of the bolt 58 on the upper rod 56 and the chain is mounted on one end of the lever by means of engagement of the bolt 38 in a selected one of pairs of aligned holes 98 provided in the side walls 40 and 42 of the lever 22 to adjust the fulcrum. The handle 24 can then be extended to the desired length by adjustment of the screw 30.

In use, the tool is transported to the site desired and the chain is attached in adjusted position to a suitable object such as an eyebolt, handle, hook or for that matter around an object, such as a small safe. The bit is held against the workpiece at any desired angle and while light pressure is exerted on the handle in a direction toward the workpiece, the power to the drill is turned on. Pressure is increased until the drill is cutting.

To drill a hole in case hardened steel, a high speed drill and a carbide or carbide-tipped twist drill is used and the action is such that as soon as the pressure is exerted the portion of the workpiece in contact with the drill bit becomes cherry red and as the drill bit works its way through the metal workpiece red hot chips are removed. It was found that with the present tool a one-quarter inch thick through hardened steel piece having a Rockwell hardness of 48–50 was penetrated with a one-quarter inch diameter carbide-tipped twist drill bit using a high speed drill, i.e. 2500–5000 rpm, in about four to about fifteen seconds. Depending upon the degree of hardness, drill speed and applied pressure, the time of penetration will vary but the tool will succeed in drilling the hole in any event. Thus the tool penetrated a thick (1 ⅛ inches diam.) chrome through hardened ball bearing having a Rockwell hardness of 60–65 in about one hour using a solid carbide bit.

The tool possesses the additional advantage in that it can be used to drill holes in hardened metal members at various angles and in generally inaccessible places rapidly and efficiently and with a minimum of effort.

While a preferred embodiment of the invention has here been shown and described, it will be understood that minor variations may be made without departing from the spirit of the invention and the scope of the appended claims.

What is claimed is:

1. A portable tool for drilling holes in a metal workpiece comprising an electric drill including a casing and a drill bit operatively carried thereby, a lever arm, a fulcrum adjacent one end of the lever arm, adjustable tie means pivoted to said fulcrum and adapted to be attached to a support in the vicinity of the metal workpiece, an elongated member pivoted at one of its ends to said lever arm intermediate its ends about an axis transverse thereto, and means securing the other end of said elongated member to said drill casing including a recess in the end of said drill casing opposite said drill bit and in alignment with the axis of said drill bit, a yoke member, a pin carried by said yoke member engaged in said casing recess, and means securing the other end of said elongated member to said yoke member above and in alignment with said recess and behind said pin, said yoke member including a pair of bars engaging said drill casing at said bit end and the end of said drill casing containing said recess, and tie members removably holding said bars together against said drill casing.

2. The combination of claim 1 wherein said pin is a set screw.

3. The combination of claim 2 wherein said set screw is carried by and extends through the bar of said yoke member which engages the end of said casing provided with said recess, a threaded counterbore in said yoke member, said other end of said elongated member being threaded and received in said counterbore and bearing on said set screw.

4. The combination of claim 1 wherein said elongated member comprises two rod sections and means interconnecting them for axial movement of one section relative to the other.

5. The combination of claim 4 wherein said means includes a reduced portion included in one rod section, a recess in the other rod section receiving said reduced portion, a circumferential groove in said reduced portion and a set screw carried by the other rod section and engaged in said groove.

6. The combination of claim 1 and means to adjust said fulcrum along the length of said lever arm.

7. The combination of claim 1 wherein said adjustable tie means pivoted to said fulcrum is a chain.

8. A portable tool for drilling holes in a metal workpiece comprising an electric drill including a casing and a drill bit operatively carried thereby, a lever arm, a fulcrum adjacent one end of the lever arm, adjustable tie means pivoted to said fulcrum and adapted to be attached to a support in the vicinity of the metal workpiece, and means interconnecting said lever arm intermediate its ends and said drill whereby the major force exerted on the lever arm towards the workpiece is transmitted along the axis of said drill bit, said last-named means including an elongated member pivoted at one of its ends to said lever arm about an axis transverse thereto, and means securing the other end of said elongated member to said drill casing so that the axis of said elongated member is maintained in alignment with the axis of said drill bit, said elongated member comprising two rod sections one having a reduced portion, a recess in the other rod section receiving said reduced portion, a circumferential groove in said reduced portion and a set screw carried by the other rod section and engaged in said groove so that the rod sections are removably connected for relative rotary movement.

9. A portable tool for drilling holes in a metal workpiece comprising an electric drill including a casing and a drill bit operatively carried thereby, a lever arm, a fulcrum adjacent one end of the lever arm, adjustable tie means pivoted to said fulcrum and adapted to be attached to a support in the vicinity of the metal workpiece, an elongated member pivoted at one of its ends to said lever arm intermediate its ends about an axis transverse thereto, and means securing the other end of said elongated member to said drill casing including a recess in the end of said drill casing opposite said drill bit and in alignment with the axis of said drill bit, a yoke member, a pin carried by said yoke member engaged in said casing recess, and means securing the other end of said elongated member to said yoke member above and in alignment with said recess and behind said pin, said yoke member including a pair of bars, one engaging said drill casing at said bit end and the other engaging the end of said drill casing containing said recess and means removably holding said members together against said drill casing.

* * * * *